(12) United States Patent
Akasaka et al.

(10) Patent No.: US 11,438,086 B2
(45) Date of Patent: Sep. 6, 2022

(54) OPTICAL AMPLIFICATION IN AN OPTICAL NETWORK

(71) Applicant: Fujitsu Limited, Kawasaki (JP)

(72) Inventors: Youichi Akasaka, Plano, TX (US); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/748,076

(22) Filed: Jan. 21, 2020

(65) Prior Publication Data

US 2021/0226719 A1 Jul. 22, 2021

(51) Int. Cl.
*H04J 14/02* (2006.01)
*H04B 10/556* (2013.01)
*H04B 10/25* (2013.01)
*G02F 1/35* (2006.01)
*H04B 10/2537* (2013.01)

(52) U.S. Cl.
CPC .... *H04J 14/0209* (2013.01); *H04B 10/25891* (2020.05); *H04B 10/5561* (2013.01); *G02F 1/3546* (2021.01); *H04B 10/2537* (2013.01)

(58) Field of Classification Search
None
See application file for complete search history.

(56) References Cited

U.S. PATENT DOCUMENTS

| | | | | |
|---|---|---|---|---|
| 5,500,756 A | * | 3/1996 | Tsushima | H04Q 11/0478 398/37 |
| 6,172,803 B1 | * | 1/2001 | Masuda | H04B 10/291 359/334 |
| 6,509,987 B1 | * | 1/2003 | Hunziker | H04B 10/291 398/79 |
| 6,529,314 B1 | * | 3/2003 | Shukunami | G02F 1/3536 359/332 |

(Continued)

FOREIGN PATENT DOCUMENTS

| | | | | |
|---|---|---|---|---|
| EP | 981189 A2 | * | 2/2000 | G02F 1/3536 |
| WO | WO-2018198478 A1 | * | 11/2018 | H01S 3/06766 |

OTHER PUBLICATIONS

Tan et al., On the Cascadability of All-Optical Wavelength Converter for High-Order QAM formats, 2016, IEEE (Year: 2016).*

(Continued)

*Primary Examiner* — Jai M Lee
(74) *Attorney, Agent, or Firm* — Baker Botts L.L.P.

(57) ABSTRACT

An optical system, comprising a first wavelength conversion module to: adjust a power of a first pump wavelength; couple an input signal with the first pump wavelength to generate a first coupled signal; perform a first wavelength conversion of the first coupled signal to generate a first wavelength converted signal, the power of the first pump wavelength is adjusted such that the first wavelength conversion is performed with 0 dB conversion efficiency; the optical amplifier to amplify the first wavelength converted signal; a second wavelength conversion module to: adjust a (Continued)

power of a second pump wavelength; couple the amplified first wavelength converted signal with the second pump wavelength to generate a second coupled signal; perform a second wavelength conversion of the second coupled signal to generate a second wavelength converted signal with 0 dB conversion efficiency.

15 Claims, 3 Drawing Sheets

(56) References Cited

U.S. PATENT DOCUMENTS

| | | | | |
|---|---|---|---|---|
| 6,577,435 | B1* | 6/2003 | Bang | G02F 2/004 359/344 |
| 6,587,259 | B2* | 7/2003 | Islam | H01S 3/13013 359/334 |
| 6,751,421 | B1* | 6/2004 | Ranka | H04B 10/291 398/178 |
| 9,857,662 | B2* | 1/2018 | Kato | H04J 14/0212 |
| 2001/0007509 | A1* | 7/2001 | Aso | H04J 14/02 385/24 |
| 2001/0031110 | A1* | 10/2001 | Imajuku | G02F 1/3519 385/15 |
| 2002/0171913 | A1* | 11/2002 | Batchko | H01S 3/0632 359/333 |
| 2004/0004780 | A1* | 1/2004 | Watanabe | G02F 1/3515 359/891 |
| 2004/0042060 | A1* | 3/2004 | McKinstrie | G02F 1/395 359/341.33 |
| 2005/0146780 | A1* | 7/2005 | McKinstrie | G02F 1/395 359/330 |
| 2006/0285197 | A1* | 12/2006 | McKinstrie | H01S 3/06758 359/333 |
| 2007/0230518 | A1* | 10/2007 | Watanabe | H04B 10/299 372/22 |
| 2011/0293273 | A1* | 12/2011 | Futami | G02F 1/3513 398/48 |
| 2015/0036210 | A1* | 2/2015 | Asobe | H01S 3/0092 359/341.3 |
| 2019/0207679 | A1* | 7/2019 | Andrekson | H04B 10/112 |
| 2019/0349113 | A1* | 11/2019 | Komiya | H04J 14/0221 |
| 2019/0353980 | A1* | 11/2019 | Shukunami | G02F 2/004 |
| 2020/0059313 | A1* | 2/2020 | Kato | H04B 10/27 |
| 2020/0200973 | A1* | 6/2020 | Yamauchi | H01S 3/0092 |
| 2020/0241384 | A1* | 7/2020 | Nakagawa | G02F 1/3536 |

OTHER PUBLICATIONS

Lee et al., Cascaded Wavelength Conversion by Four-Wave Mixing in a Strained Semiconductor Optical Amplifier at 10 Gb/s, 1997, IEEE (Year: 1997).*

RP Photonics Encyclopedia, Erbium-doped Fiber Amplifier, 2019 (Year: 2019).*

Wabnitz et al., All-Optical Signal Processing, 2015, Springer (Year: 2015).*

* cited by examiner

OPTICAL AMPLIFICATION IN AN OPTICAL NETWORK

BACKGROUND

Field of the Disclosure

The present disclosure relates generally to optical communication networks, and more particularly, to amplifying optical signals in optical communication networks.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). Optical networks may also include various optical elements, such as amplifiers, dispersion compensators, multiplexer/demultiplexer filters, wavelength selective switches (WSS), optical switches, couplers, etc. to perform various operations within the network.

Capacity demand of optical networks is continually growing and optical bandwidth is exhausted to carry more signals. Currently, for expanding capacity demand, band amplifiers have been used but can have issues such as material reliability (e.g., thulium doped amplifier for S-band) and/or limitations on output power due to pump saturation and signal distortion by fiber nonlinearity (e.g., discrete Raman amplifier for S-Band).

SUMMARY

Innovative aspects of the subject matter described in this specification may be embodied in an optical system for amplifying optical signals, comprising: a first wavelength conversion module configured to: receive a wavelength division multiplexing (WDM) input signal; adjust a power of a first pump wavelength based on a bandwidth of an optical amplifier; couple the WDM input signal with the first pump wavelength to generate a first coupled signal; perform a first wavelength conversion of the first coupled signal to generate a first wavelength converted signal, wherein the power of the first pump wavelength is adjusted such that the first wavelength conversion is performed with a conversion efficiency approximately between −5 dB and 5 dB; the optical amplifier configured to amplify the first wavelength converted signal to generate an amplified first wavelength converted signal; a second wavelength conversion module configured to: receive the amplified first wavelength converted signal; adjust a power of a second pump wavelength; couple the amplified first wavelength converted signal with the second pump wavelength to generate a second coupled signal; perform a second wavelength conversion of the second coupled signal to generate a second wavelength converted signal, wherein the power of the second pump wavelength is adjusted such that the second wavelength conversion is performed with a conversion efficiency approximately between −5 dB and 5 dB; and output the second wavelength converted signal.

Other embodiments of these aspects include corresponding methods, apparatus, and computer programs, configured to perform the actions of the methods, encoded on computer storage devices.

These and other embodiments may each optionally include one or more of the following features. For instance, the optical amplifier is an erbium doped fiber amplifier (EDFA). The first wavelength conversion module further comprising: a first wavelength conversion pump to generate the first pump wavelength; a first coupler configured to combine the WDM input signal with the first pump wavelength to generate the first coupled signal; and a first non-linear element (NLE) configured to add an idler signal to the first coupled signal to perform the first wavelength conversion of the first coupled signal to generate the first wavelength converted signal. Further comprising a first optical tunable filter (OTF) to filter the WDM input signal and the first pump wavelength from the first wavelength converted signal. The optical amplifier amplifies the idler signal included in the first wavelength converted signal. The second wavelength conversion module further comprising: a second wavelength conversion pump to generate the second pump wavelength; a second coupler configured to combine the amplified idler signal included in the first wavelength converted signal with the second pump wavelength; and a second NLE configured to generate an additional amplified signal for the second coupled signal to perform the second wavelength conversion of the second coupled signal to generate the second wavelength converted signal. Further comprising a second OTF to filter the amplified idler signal and the second pump wavelength from the second converted signal. The second wavelength conversion module outputs the additional amplified signal. The first pump wavelength and the second pump wavelength are phase modulated to suppress stimulated Brillouin scattering (SBS). The power of the first pump is adjusted such that the first wavelength conversion is performed with approximately 0 dB conversion efficiency, and the power of the second pump is adjusted such that the second wavelength conversion is performed with approximately 0 dB efficiency.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
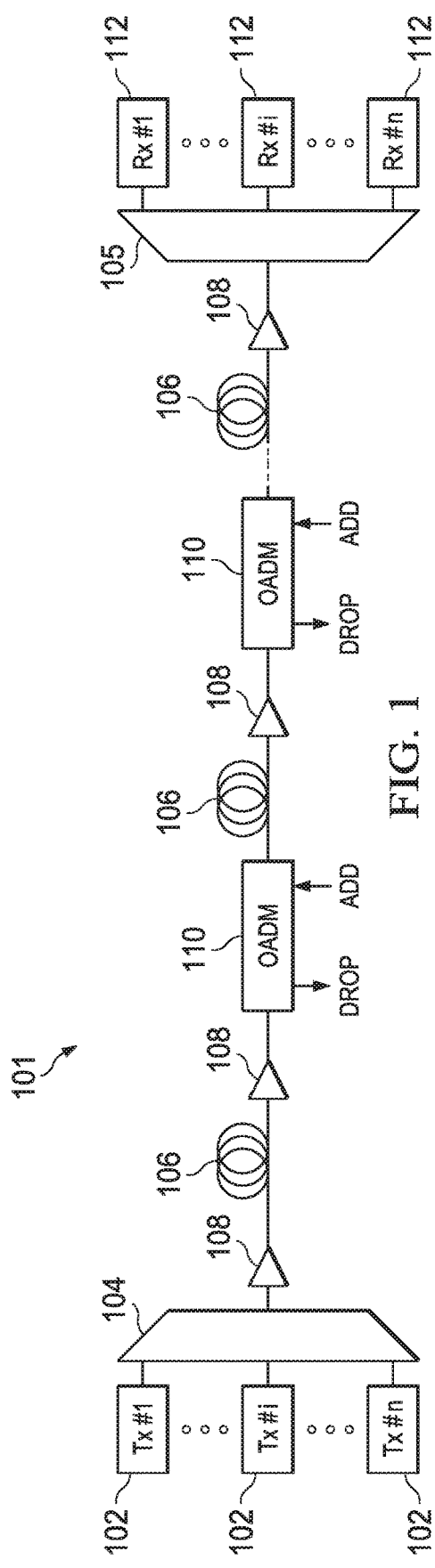
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal. Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM. ROADMs are considered 'colorless' when the ROADM is able to add/drop any arbitrary wavelength. ROADMs are considered 'directionless' when the ROADM is able to add/drop any wavelength regardless of the direction of propagation. ROADMs are considered 'contentionless' when the ROADM is able to switch any contended wavelength (already occupied wavelength) to any other wavelength that is available.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal.

Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the optical signal noise ratio (OSNR) for transmission over optical network 101.

Current designs for optical amplifiers may include optical phase-sensitive amplifiers (PSA). A typical phase-sensitive optical amplifier will have different stages, including an idler stage to initially generate an idler signal using an optical pump and an amplification stage to amplify the input signal using the optical pump and the idler signal. In between the idler stage and the amplification stage, an intermediate stage may be implemented in the phase-sensitive optical amplifier. The intermediate stage may involve complex signal processing and pump power recovery to adjust the power level of the input signal and the idler signal. In typical phase-sensitive optical amplifiers, the optical paths of the input signal, the optical pump, and the idler signal may be separated in the intermediate stage in order to independently modulate power of each of the signals.

Figure 2:
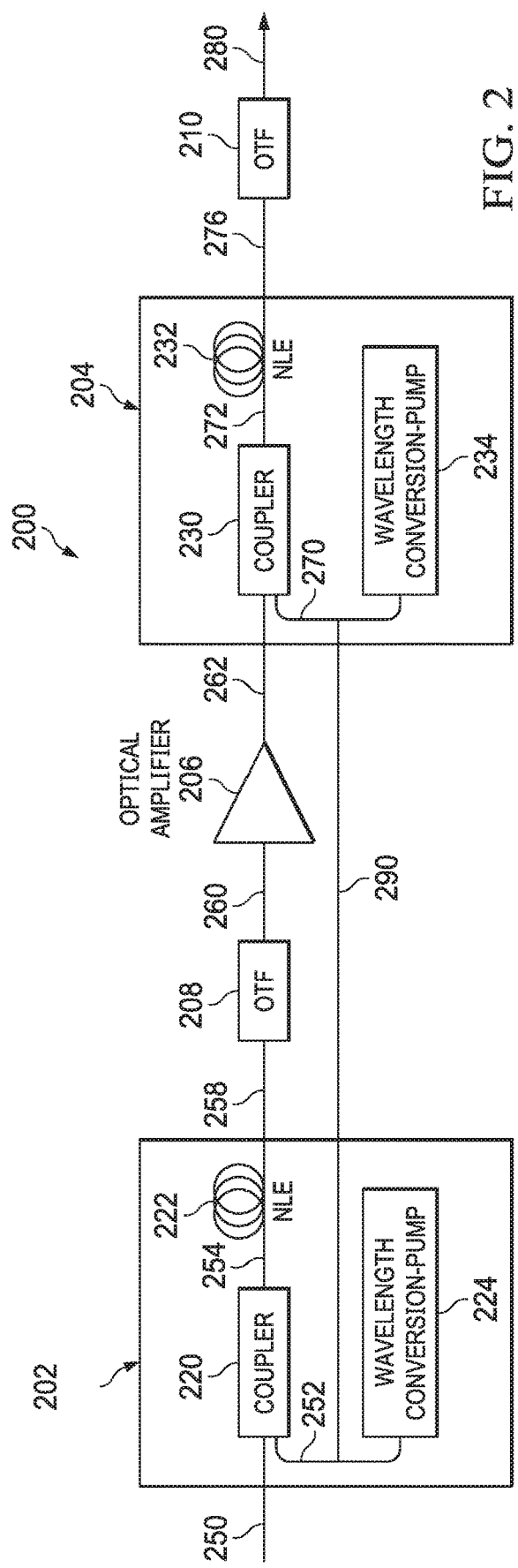
FIG. 2 is a block diagram of selected elements of an embodiment of an optical system for amplifying optical signals.

FIG. 2 is a block diagram of an optical system 200 for amplifying optical signals. The optical system 200 can include a first wavelength conversion module 202, a second wavelength conversion module 204, an optical amplifier 206, a first optical tunable fiber (OTF) 208, and a second OTF 210. The first wavelength conversion module 202 can include a first coupler 220, a first non-linear element (NLE) 222, and a first wavelength conversion pump 224. The second wavelength conversion module 204 can include a second coupler 230, a second NLE 232, and a second wavelength conversion pump 234. In some examples, the optical system 200 can include all or a portion of the optical network 101 of FIG. 1.

The first wavelength conversion module 202 can receive a wavelength division multiplexing (WDM) input optical signal 250. The first wavelength conversion module 202 can perform a first wavelength conversion of the input signal 250 based on a bandwidth of the optical amplifier 206 between approximately −5 dB and 5 dB conversion efficiency, and specifically, with approximately 0 dB conversion efficiency. In other words, the first wavelength conversion module 202 does not provide amplification of the input signal 250. Specifically, the first wavelength conversion pump 224 can generate a first pump wavelength 252. The first wavelength conversion pump 224 can adjust the power of the first pump wavelength 252 based on the bandwidth of the optical amplifier 206. In some examples, the power of the first pump wavelength 252 can be adjusted such that a first wavelength conversion of the input signal 250 is performed with approximately 0 dB conversion efficiency. That is, the conversion efficiency of the first wavelength conversion module 202 is based (or proportional) to a fiber nonlinearity of the optical system 200, the pump power of the first wavelength conversion pump 224, and a degree of phase matching (e.g., zero chromatic dispersion matching). For example, for a 0 dB conversion efficiency of the first wavelength conversion, the first wavelength conversion pump 224 can adjust the power of the first pump wavelength 252 to 24 dBm.

The first coupler 220 can combine (add) the input signal 250 with the first pump wavelength 252. Combined signal 254, comprising the input signal 250 and the first pump wavelength 252, are sent (injected) to the first NLE 222 to add an idler signal 256 (shown in FIG. 3), resulting in a first wavelength converted signal 258. In some examples, in the first NLE 222, photons are converted from the first pump wavelength 252 and the input signal 250 to the idler signal 256 by non-linear processes.

In some examples, the first wavelength conversion pump 224 is an amplified laser (e.g., an erbium doped fiber amplifier (EDFA) laser) that is able to arise fiber nonlinearity in the first NLE 222.

In some examples, the first NLE 222 is a highly non-linear fiber (HNLF) such that the first wavelength converted signal 258 has nonlinear effects. In some examples, the first NLE 222 can include a nonlinear optical crystal, a nonlinear optical waveguide, or any other combination of nonlinear optical media having an appropriate strength of nonlinear refractive index.

In some examples, the input signal 250 is within the S-band (e.g., 1510-1518 nanometers), and after conversion by the first wavelength conversion module 202, the first wavelength converted signal 258 is within the C-band (e.g., 1530-1565 nanometers).

Figure 3:
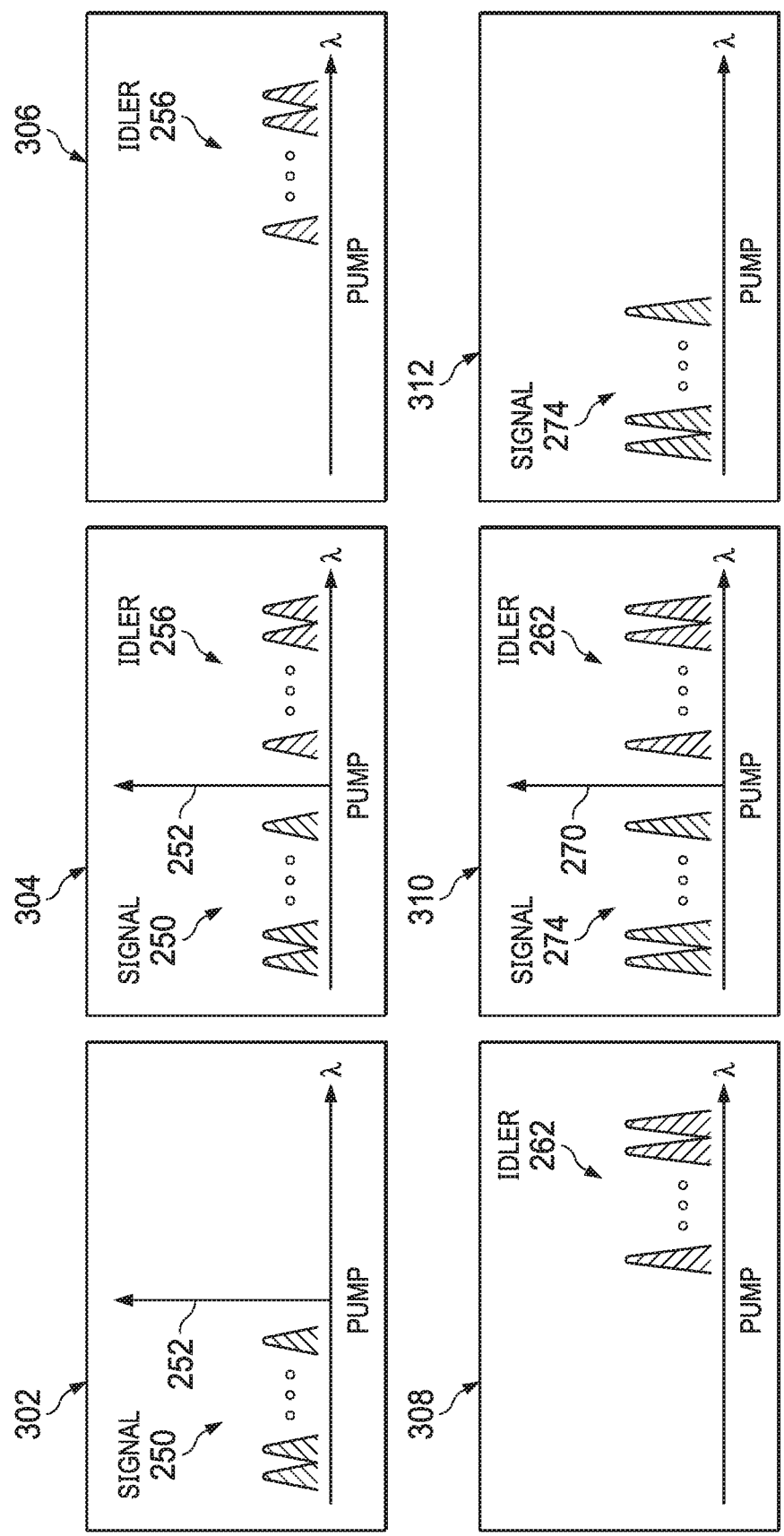
FIG. 3 are illustrative spectra of different signals transmitted through the optical system.

FIG. 3 illustrates spectra of the different signals transmitted through the first wavelength conversion module 202. In spectra 302, corresponding to the combined signal 254, the first pump wavelength 252 is added to the input signal 250. In spectra 304, corresponding to the first wavelength converted signal 258, the idler signal 256 has been added.

Returning back to FIG. 2, the first OTF 208 filters (removes) the input signal 250 and the first pump wavelength 252 from the first wavelength converted signal 258, generating a first output signal 260. As shown in FIG. 3, in spectra 306, corresponding to the first output signal 260, the input signal 252 and the first pump wavelength 252 have been filtered (removed).

The optical amplifier 206 amplifies the first output signal 260, producing amplified idler signal 262 In some examples, the optical amplifier 206 is an EDFA. As shown in FIG. 3, spectra 308 corresponds to the amplified idler signal 262.

The second wavelength conversion module 204 can receive the amplified idler signal 262. The second wavelength conversion module 204 can perform a second wavelength conversion of the amplified idler signal 262 between approximately −5 dB and 5 dB conversion efficiency, and specifically, with approximately 0 dB conversion efficiency. Specifically, the second wavelength conversion pump 234 can generate a second pump wavelength 270. The second wavelength conversion pump 234 can adjust the power of the second pump wavelength 270. In some examples, the power of the second pump wavelength 270 can be adjusted such that the second wavelength conversion of the amplified idler signal 262 is performed with approximately 0 dB conversion efficiency. That is, the conversion efficiency of the second wavelength conversion module 204 is based (or proportional) to a fiber nonlinearity of the optical system 200, the pump power of the second wavelength conversion pump 234, and a degree of phase matching (e.g., zero chromatic dispersion matching). For example, for a 0 dB conversion efficiency of the second wavelength conversion, the second wavelength conversion pump 234 can adjust the power of the second pump wavelength 270 to 24 dBm.

The second coupler 230 can combine (add) the amplified idler signal 262 with the second pump wavelength 270. Combined signal 272, comprising the amplified idler signal 262 and the second pump wavelength 270, are sent (injected) to the second NLE 232 to generate an additional amplified signal 274 (shown in FIG. 3), resulting in a second wavelength converted signal 276. The frequency of the additional amplified signal 274 is symmetrically mirrored to the frequency of the amplified idler signal 262. In some examples, in the second NLE 232, photons are converted from the second pump wavelength 270 and the amplified idler signal 262 to the additional amplified signal 274 (idler wavelengths of the amplified idler wavelength) by non-linear processes.

In some examples, the second wavelength conversion pump 234 is an amplified laser (e.g., an erbium doped fiber amplifier (EDFA) laser) that is able to arise fiber nonlinearity in the second NLE 232.

In some examples, the second NLE 232 is a highly non-linear fiber (HNLF) such that the second wavelength converted signal 276 has nonlinear effects. In some examples, the second NLE 232 can include a nonlinear optical crystal, a nonlinear optical waveguide, or any other combination of nonlinear optical media having an appropriate strength of nonlinear refractive index.

In some examples, the amplified idler signal 262 is within the C-band, and after conversion by the second wavelength conversion module 204, the second wavelength converted signal 276 is within the S-band.

FIG. 3 further illustrates spectra of the different signals transmitted through the second wavelength conversion module 204. In spectra 310, corresponding to the second wavelength converted signal 276, additional amplified signal 274 is added to the amplified idler signal 262 and the second pump wavelength 270.

Returning back to FIG. 2, the second OTF 210 filters (removes) the amplified idler signal 262 and the second pump wavelength 270 from the second wavelength converted signal 276, generating a second output signal 280. As shown in FIG. 3, in spectra 312, corresponding to the second output signal 280, the amplified idler signal 262 and the second pump wavelength 270 have been filtered (removed).

The second OTF 210 can output the second output signal 280, and specifically, outputs the additional amplified signal 274.

In some examples, the first wavelength conversion pump 224 and the second wavelength conversion pump 234 are phase modulated to suppress stimulated Brillouin scattering (SBS). Specifically, a tone of the SBS suppression for the first wavelength conversion pump 224 and the second wavelength conversion pump 234 are synchronized to remove noise from the pumps 224, 234, shown by a connection 290 between the first pump wavelength 252 and the second pump wavelength 270. That is, the first wavelength conversion pump 224 and the second wavelength conversion pump 234 can have opposite signs of phase modulations.

In some examples, a noise performance of the cascaded amplification of the system 200 is substantially the same as a noise performance of the first wavelength conversion module 202. As a result, a conversion efficiency of the first wavelength conversion module 202 is between approximately −5 dB and 5 dB, and specifically, approximately 0 dB (e.g., no amplification). In some cases, the conversion efficiency of the first wavelength conversion module 202 can be less than 0 dB, but proximate to 0 dB. The optical amplifier 206 provides the amplification of the signal to achieve low noise performance (as compared to the first wavelength conversion module 202, the second wavelength conversion module 204, or both). In some examples, when the span loss is approximately 20 dB, the optical amplifier 206 can have greater than 10 dB gain. As a result, the second wavelength conversion module 204 can provide gain to the signal (e.g., optical parametric amplification).

Figure 4:
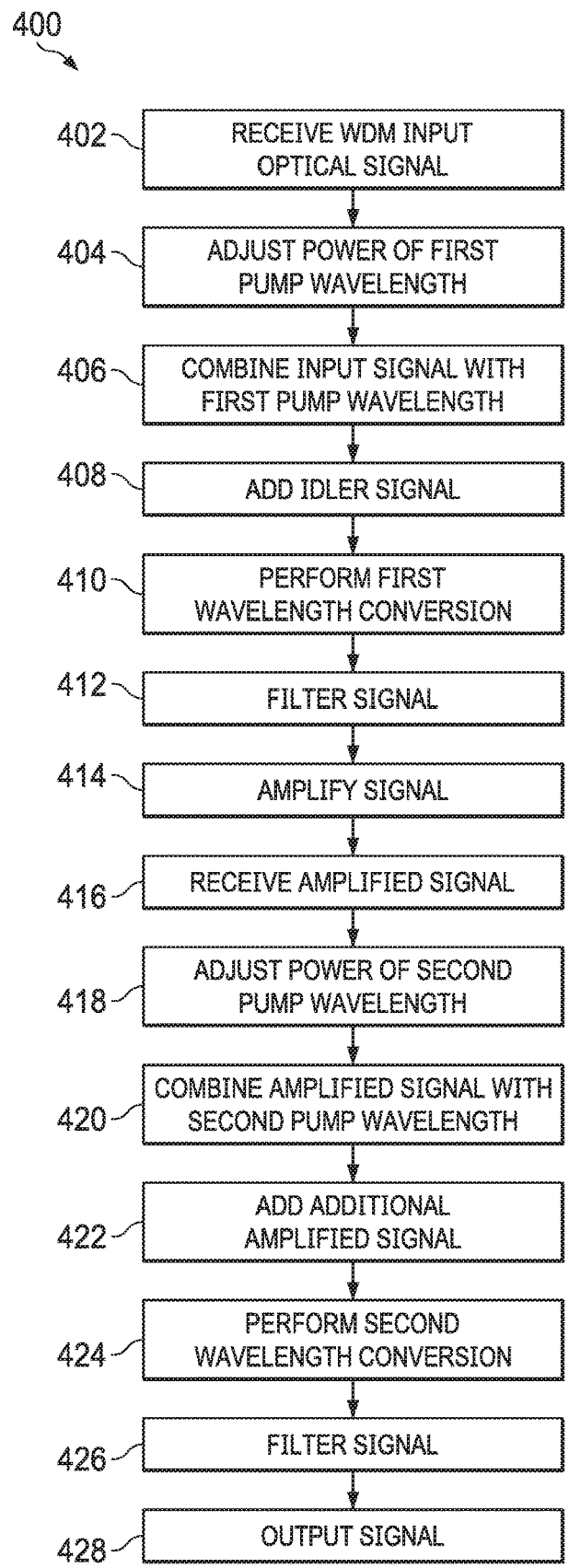
FIG. 4 is a flowchart for amplifying optical signals in the optical network.

FIG. 4 illustrates a flowchart depicting selected elements of an embodiment of a method 400 for amplifying optical signals in the optical network 200. The method 400 may be performed by the optical network 200, including the first wavelength conversion module 202, the second wavelength conversion module 204, the optical amplifier 206, the first OTF 208, and the second OTF 210. It is noted that certain operations described in method 400 may be optional or may be rearranged in different embodiments.

The first wavelength conversion module 202 can receive a wavelength division multiplexing (WDM) input optical signal 250 (402). The first wavelength conversion pump 224 adjusts a power of a first pump wavelength 252 based on the bandwidth of the optical amplifier 206 (404). The first coupler 220 combines (adds) the input signal 250 with the first pump wavelength 252 to generate the combined signal 254 (406). The NLE 222 adds the idler signal 256 to the combined signal 254 (408). The first wavelength conversion module 202 performs a first wavelength conversion of the combined signal 254 to generate the first wavelength converted signal 258 between approximately −5 dB and 5 dB conversion efficiency, and specifically, with approximately 0 dB conversion efficiency (410). The first OTF 208 filters (removes) the input signal 250 and the first pump wavelength 252 from the first wavelength converted signal 258, generating a first output signal 260 (412). The optical amplifier 206 amplifies the first output signal 260, producing amplified idler signal 262 (414).

The second wavelength conversion module 204 can receive the amplified idler signal 262 (416). The second wavelength conversion pump 234 adjusts a power of a second pump wavelength 270 (418). The second coupler 230 combines (adds) the amplified idler signal 262 with the second pump wavelength 270 to generate combined signal 272 (420). The NLE 232 generates the additional amplified signal 274 that is included by the combined signal 272 (422). The second wavelength conversion module 204 performs a second wavelength conversion of the combined signal 272 to generate the second wavelength converted signal 276 between approximately −5 dB and 5 dB conversion efficiency, and specifically, with approximately 0 dB conversion efficiency (424). The second OTF 210 filters (removes) the amplified idler signal 262 and the second pump wavelength 270 from the second wavelength converted signal 276, generating a second output signal 280 (426). The second OTF 210 outputs the second output signal 280 (428).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An optical system for amplifying optical signals, comprising:
   a first wavelength conversion module configured to:
      receive a wavelength division multiplexing (WDM) input signal;
      adjust a power of a first pump wavelength;
      couple the WDM input signal with the first pump wavelength to generate a first coupled signal;
      perform a first wavelength conversion of the first coupled signal to generate a first wavelength converted signal, wherein the power of the first pump wavelength is adjusted such that the first wavelength conversion is performed with a conversion efficiency of approximately between 5 dB and 5 dB;
   an optical amplifier configured to amplify the first wavelength converted signal to generate an amplified first wavelength converted signal;
   a second wavelength conversion module configured to:
      receive the amplified first wavelength converted signal;
      adjust a power of a second pump wavelength;
      couple the amplified first wavelength converted signal with the second pump wavelength to generate a second coupled signal;
      perform a second wavelength conversion of the second coupled signal to generate a second wavelength converted signal, wherein the power of the second pump wavelength is adjusted such that the second wavelength conversion is performed with a conversion efficiency of approximately between 5 dB and 5 dB; and output the second wavelength converted signal, wherein the first wavelength conversion module comprises:
a first wavelength conversion pump to generate the first pump wavelength; a first coupler configured to combine the WDM input signal with the first pump wavelength to generate the first coupled signal; and a first non-linear element (NLE) configured to add an idler signal to the first coupled signal to perform the first wavelength conversion of the first coupled signal to generate the first wavelength converted signal,
the optical amplifier amplifies the idler signal included in the first wavelength converted signal, and
the second wavelength conversion module comprises: a second wavelength conversion pump to generate the second pump wavelength; a second coupler configured to combine the amplified idler signal included in the first wavelength converted signal with the second pump wavelength; and a second NLE configured to generate an additional amplified signal for the second coupled signal to perform the second wavelength conversion of the second coupled signal to generate the second wavelength converted signal; and
a direct connection is provided between the first wavelength conversion pump and the second wavelength conversion pump in which information for synchronizing the first wavelength conversion pump and the second wavelength conversion pump is communicated through the connection,
wherein the first pump wavelength and the second pump wavelength are phase modulated to suppress stimulated Brillouin scattering (SBS).

2. The optical system of claim 1, wherein the optical amplifier is an erbium doped fiber amplifier (EDFA).

3. The optical system of claim 1, further comprising a first optical tunable filter (OTF) to filter the WDM input signal and the first pump wavelength from the first wavelength converted signal.

4. The optical system of claim 1, further comprising a second OTF to filter the amplified idler signal and the second pump wavelength from the second converted signal.

5. The optical system of claim 4, wherein the second wavelength conversion module outputs the additional amplified signal.

6. The optical system of claim 1, wherein the power of the first pump is adjusted such that the first wavelength conversion is performed with approximately 0 dB conversion efficiency, and the power of the second pump is adjusted such that the second wavelength conversion is performed with approximately 0 dB efficiency.

7. A method for amplifying optical signals in an optical network, comprising:
receiving a wavelength division multiplexing (WDM) input signal;
adjusting a power of a first pump wavelength;
coupling the WDM input signal with the first pump wavelength to generate a first coupled signal;
performing a first wavelength conversion of the first coupled signal to generate a first wavelength converted signal, wherein the power of the first pump is adjusted such that the first wavelength conversion is performed with a conversion efficiency of approximately between −5 dB and 5 dB;
amplifying the first wavelength converted signal with the optical amplifier to generate an amplified first wavelength converted signal;
adjusting a power of a second pump wavelength;
coupling the amplified first wavelength converted signal with the second pump wavelength to generate a second coupled signal;
performing a second wavelength conversion of the second coupled signal to generate a second wavelength converted signal, wherein the power of the second pump is adjusted such that the second wavelength conversion is performed with a conversion efficiency of approximately between −5 dB and 5 dB;
directly connecting a first wavelength conversion pump and a second wavelength conversion pump in which information for synchronizing the first wavelength conversion pump and the second wavelength conversion pump is communicated through a connection between the first wavelength conversion pump and the second wavelength conversion pump; and
outputting the second wavelength converted signal, wherein
wherein the first pump wavelength and the second pump wavelength are phase modulated to suppress stimulated Brillouin scattering (SBS).

8. The method of claim 7, wherein performing the first wavelength conversion further includes adding an idler signal to the first coupled signal to perform the first wavelength conversion of the first coupled signal to generate the first wavelength converted signal.

9. The method of claim 8, after adding the idler signal, filtering the WDM input signal and the first pump wavelength from the first wavelength converted signal.

10. The method of claim 9, wherein amplifying the first converted signal includes amplifying the idler signal included in the first wavelength converted signal.

11. The method of claim 10, wherein performing the second wavelength conversion further includes generating an additional amplified signal to the second coupled signal to perform the second wavelength conversion of the second coupled signal to generate the second wavelength converted signal.

12. The method of claim 11, after adding the additional signal, filtering the amplified idler signal and the second pump wavelength from the second converted signal.

13. The method of claim 12, wherein outputting the second converted signal includes outputting the additional amplified signal.

14. The method of claim 11, wherein the first pump wavelength and the second pump wavelength are phase modulated to suppress stimulated Brillouin scattering (SBS).

15. The optical system of claim 1, wherein the first wavelength conversion module does not provide amplification of the WDM input signal.

* * * * *